April 27, 1948.  G. F. DRAKE  2,440,255
REMOTE CONTROL SYSTEM
Filed July 14, 1944  4 Sheets-Sheet 3

INVENTOR
George Forrest Drake
By Carlson, Pitzner, Hubbard & Wolfe
ATTORNEYS

Patented Apr. 27, 1948

2,440,255

UNITED STATES PATENT OFFICE 2,440,255

REMOTE-CONTROL SYSTEM

George Forrest Drake, Rockford, Ill., assignor to Woodward Governor Company, Rockford, Ill., a corporation of Illinois Application July 14, 1944, Serial No. 544,963

12 Claims. (Cl. 74—388)

This invention relates to systems for variably positioning a part in response to changes in the position of a control element located at a remote point. The invention is applicable more particularly to systems in which the part to be positioned is associated with a power driven member such as a member driven by a prime mover.

The primary object is to provide an electric remote control system of the above character which avoids the necessity of associating an electric motor with the part to be positioned.

A more detailed object is to utilize the associated power driven member as a source of power for actuating the part to be positioned while at the same time keeping it in step with the remotely located control element.

Another object is to adapt the system for positioning a plurality of remotely located parts from a central point of control.

The invention also resides in the novel structural character of the mechanism employed in carrying out the foregoing objects.

Other objects and advantages of the invention will become apparent from the following detailed description taken in connection with the accompanying drawings, in which Figure 1 is a schematic view and wiring diagram of the improved control applied to governor controlled prime movers.

Figure 3:
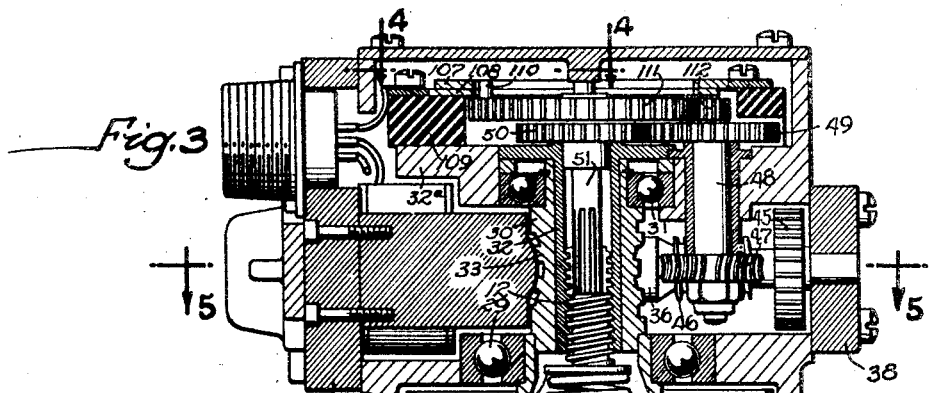
Fig. 3 is a vertical diametrical cross-sectional view of the governor.
Figure 4:
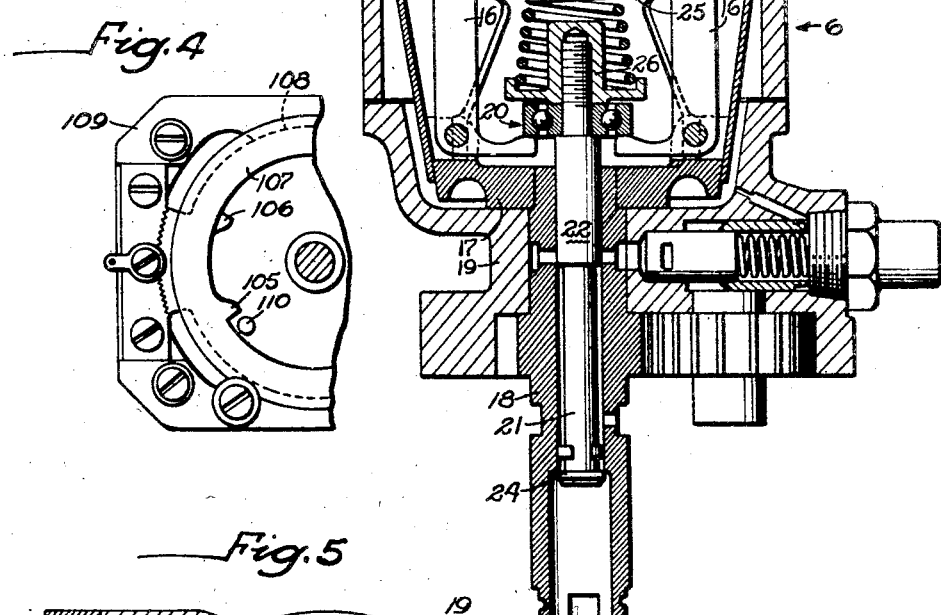
Figure 5:
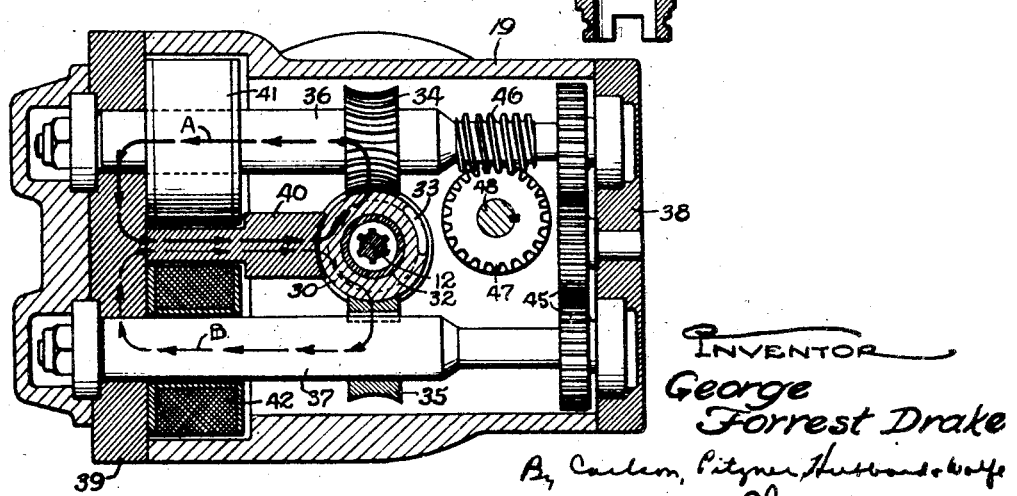

Figs. 4 and 5 are fragmentary sectional views taken respectively along the lines 4—4 and 5—5 of Fig. 3.

Figure 6:
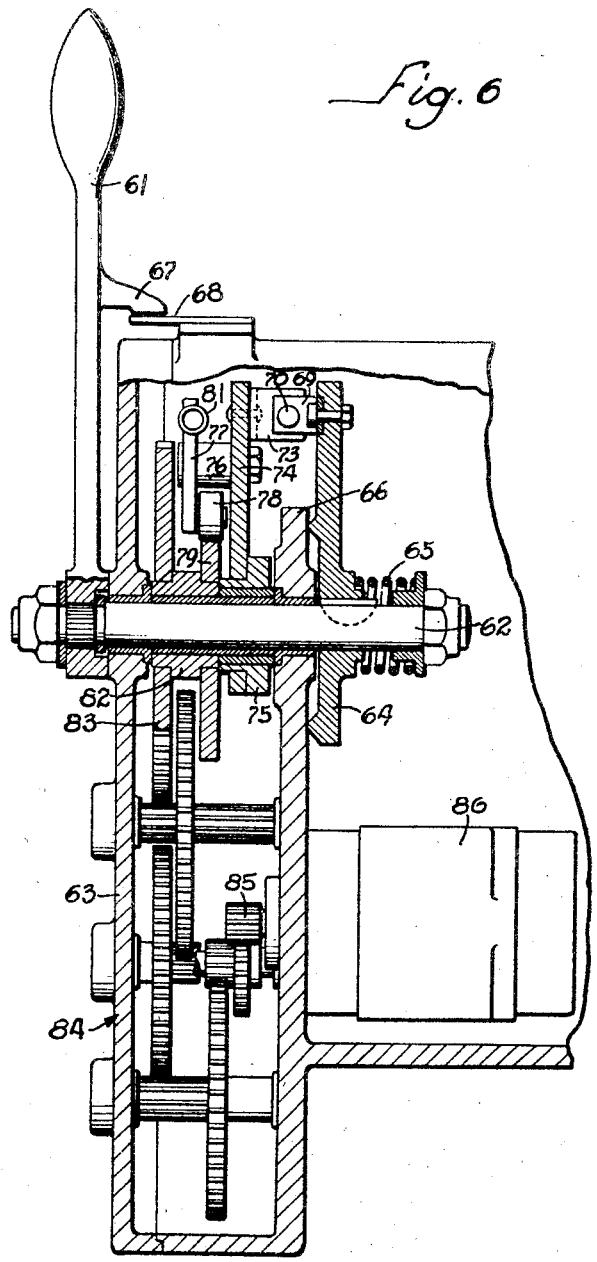

Fig. 6 is a vertical sectional view of the manually operable control mechanism.

The invention has been shown in the drawings and will be described herein as applied to adjustment of the speed settings of the governors 6 and 7 for regulating the speeds of a plurality of prime movers or airplane engines 8 and 9. It is to be understood, however, that I do not intend to limit the invention by such disclosure nor to the particular illustrated constructions of the various switches, relays, governors, couplings, motor units and electrical transmitters, but aim to cover all modifications, alternative constructions and uses falling within the scope of the invention as expressed in the appended claims.

In the adaptation of the improved remote control system shown in the drawings, power derived from rotary members such as shafts 10 and 11 driven by the prime movers 8 and 9 is utilized to actuate and variably position parts 12 which are the speed adjusters of the governors 6 and 7 that effect speed regulation by adjusting the pitch of propellers 14 driven by the engines. Pitch changes are effected in a well known manner by hydraulic servos 15.

In general, each governor includes flyballs 16 pivoted on a ball head 17 which is fast on the upper end of a vertical sleeve 18 journaled in a casing 19 and connected at its lower end with the shaft 10 of the prime mover. Arms on the flyballs bear upwardly against the outer race of a ball bearing 20 whose inner race is carried by a stem 21 of a valve which constitutes the speed controlling device. In response to a detected speed increase, a land 22 on the valve stem is raised to admit pressure fluid from a pump 23 to the servo 15 which thereupon increases the propeller pitch and reduces the engine speed. In response to a speed decrease, a land 24 is lowered allowing fluid from the servo 15 to drain out through the lower end of the drive sleeve 18 and increase the engine speed.

The flyball force applied to the valve stem 21 is, in accordance with the usual practice, balanced against the downwardly directed force of a coiled speeder spring 25 acting in compression between a cap 26 on the upper end of the stem 21 and a movable abutment 27 provided on the lower end of the speed adjusting part 12. The latter threads into a nut 32 fixed in the upper part of the governor casing so that by turning the screw varying amounts in one direction or the other, the abutment may be raised and lowered axially to correspondingly vary the loading of the spring and, therefore, the speed setting of the governor. Since the force of the spring is transmitted to the flyballs through the bearing 20, the spring does not rotate, and the speed of the governor may be adjusted while the flyballs are rotating.

Mechanism for transmitting power derived from the engine to the actuated part 12 is housed in the upper part of the governor casing. Herein, this mechanism includes a hollow frusto-conical extension 28 of the governor drive shaft 18 fixed at its lower end to the top of the ball head 17 and having side openings through which the flyballs project. At its upper end, the member 28 is journaled in a bearing 29 and this end is coupled, as by a press fit, to the lower end of a sleeve 30 whose upper end is journaled in a bearing 31 in a partition 32ª which non-rotatably supports the upper end flange on the nut 32.

While the connections for driving the screw 12 in one direction or the other from the unidirectionally rotating shaft extension 28 may be formed by clutches of various kinds, it is preferred to employ gearings having elements which are mechanically disengaged at all times but which mesh with each other magnetically so as to transmit power when energized. Herein, the gearings comprise a squared thread 33 formed on the exterior of the drive sleeve 30 and concaved longitudinally to lie closely adjacent but out of mechanical contact with similarly shaped and pitched teeth on two worm gears 34 and 35 which are similarly concaved to follow the worm contour within the active meshing areas. The gears are disposed on diametrically opposite sides of the worm and fast on horizontal shafts 36 and 37 which are journaled in a non-magnetic side plate 38 and a magnetic side plate 39, these plates being secured to opposite sides of the casing. The gears and shafts are composed of magnetizable material and included in low reluctance flux paths A and B (Fig. 5) which are completed through the plate 39 and a horizontal projection 40 therefrom having a concave end face which terminates close to the periphery of the worm thread 33 midway between the gears.

Windings 41 and 42 carried by the shafts 36 and 37 may be energized selectively as by closure of one or the other of switches 43 and 44 (Fig. 1) thereby causing flux to thread the corresponding flux path A or B. Thus, rotary power will be transmitted from the worm 32 to one or the other of the shafts 36 and 37 depending on which of the windings is energized, the shafts being driven in opposite directions. Suitable means is provided for minimizing the leakage of flux away from the intended path.

To transmit the opposite rotary motions of the shafts 36 and 37 to the speed adjusting screw 12, the shafts are interconnected by gears 45, and fast on the shaft 36 adjacent these gears is a worm 46 meshing with a worm wheel 47 on the lower end of a vertical shaft 48 which is journaled in the plate 32ª. This shaft carries a gear 49 meshing with a gear 50 on a shaft 51 which is journaled in the stationary sleeve 32 and is splined at its lower end into the upper end of the screw 12.

It will be seen from the foregoing that power derived from the associated engine will be transmitted to the screw 12 when either of the windings A and B is energized, and that the screw will be turned in one direction or the other depending on which of the windings is active. By controlling the direction and extent of rotation of the screw, the adjustment of the governor and, therefore, the engine speed may be increased or decreased as desired.

Means controllable from the remote point is provided for establishing a predetermined relation between or equalizing the speed adjustments of the two governors. Herein, this means comprises adjustable stops 105 and 106 (Figs. 3 and 4) for limiting to a selected maximum and minimum the rotary motion that may be transmitted to the speed adjusters in response to continued energization of one of the magnetic couplings. The stops are in the form of lugs projecting inwardly from rings 107 and 108 which are mounted on blocks 109 for angular adjustment about the axis of the adjusting screw 12. They coact with a pin 110 carried by a gear 111 which overlies the gear 50 and is mounted thereon to turn relative to the gear. A pinion 112 on the upper end of the shaft 48 meshes with the gear 111, and the two provide a speed reduction by which the gear 111 and the pin 110 turn in unison with the speed adjuster 12 but through a range of less than one revolution while the adjuster is moving through its full range. By continuing the energization of one or the other of the coupling windings 41 and 42, it will be observed that the speed adjuster of the governor may be brought to a maximum or minimum position determined by the setting of the stops 105 and 106. Such stalling of the driven parts is made possible by the magnetic transmission of power from the engines, the coacting parts of the couplings always remaining mechanically disengaged.

The magnetic coupling control switches 43 and 44 have movable contacts 52 connected to one lead from a battery 53 and stationary contacts connected by conductors 54 and 55 to the respective windings 41 and 42. The common terminals of each pair of windings is connected by a conductor 56 to the battery lead 57. Herein the movable contacts 43 are joined to a movable member 58 carrying the armatures of solenoids 59 and 60.

Selective energization of the solenoids 59 and 60 to close the switches 43 or 44 and cause a corresponding change in the speed settings of both engine governors is effected by movement of a manually operable control element 61 (Figs. 1 and 6) to a position corresponding to a newly selected governor speed setting. The element 61 is located at the remote point of control, in this instance, the cockpit of the airplane. Herein, the element comprises a hand lever fast on a shaft 62 which is journaled in and projects from one wall of a casing 63. Rotatable with the shaft 62 is a disk 64 urged by a compression spring 65 against a stationary plate 66 to create the friction necessary to hold the lever 61 in any selected position. A pointer 67 on the lever coacts with a scale 68 to indicate the governor speed setting.

Mounted on an arm 69 projecting from the disk 64 is the common contact 70 of switches 71 and 72 whose stationary contacts are carried by spaced lugs 73 projecting rearwardly from an arm 74. The latter is loose on a bushing 75 on the shaft 62 and carries the pivot 76 of a bell crank 77. A roller 78 on the latter constitutes the follower of a heart-shaped cam 79 having gradual rises on opposite sides of a notch 80. A spring 81 acting between the bell cranks and the arm 74 holds the roller in contact with the cam surface, the arrangement being such that when the roller is disposed in the notch, the contact 70 is disposed between the cooperating contacts and both switches 71 and 72 will be open. When the roller is engaging either incline, the arm 74 is shifted relative to the arm 69, and one or the other of the insulated contacts is pressed against the common contact 70. The cam 79 is fast on a sleeve 82 carrying a gear 83 driven through reduction gearing 84 from a pinion 85 on the shaft of an electric motor 86. This motor and the associated parts of the follow-up mechanism are housed within the casing 63.

It will be observed that the two arms 69 and 74 are swingable about a common axis and are adapted for the limited degree of relative movement required to actuate the switches 71 and 72. The cam 79 and its follower provide a connection between the arm 74 and the cam shaft which is adapted to yield in either direction after closure of one switch and permit both arms to move in unison to the position selected by movement of the control lever 61. Thereafter, the cam is actuated by the motor 86 in a direction to follow up the movement of the two arms and thus determines the duration of the switch closure.

In accordance with the present invention, provision is made for maintaining the follow-up member or cam 79 approximately in step with the speed adjusters 12, so that even though the speed adjusters are actuated by power derived from their associated prime movers, the active control switch 70 or 71 located at the remote control point will, nevertheless, be opened and the motion of the adjusters interrupted when the follower-up cam reaches the position selected by the lever 61. For this purpose, the motor 86 is arranged to be energized only when one or the other of the control switches 70 and 71 is closed and to follow accurately the motion of the driving element 18 of the magnetic couplings of each governor. While various types of self-synchronous electrical transmitters and receivers may be employed for this purpose, the one shown herein comprises a so-called commutating switch 87 (Figs. 1 and 2) driven by one of the prime movers 8 and electrically connected through conductors 88 to the motor 86 which is of the so-called step type.

Figure 2:
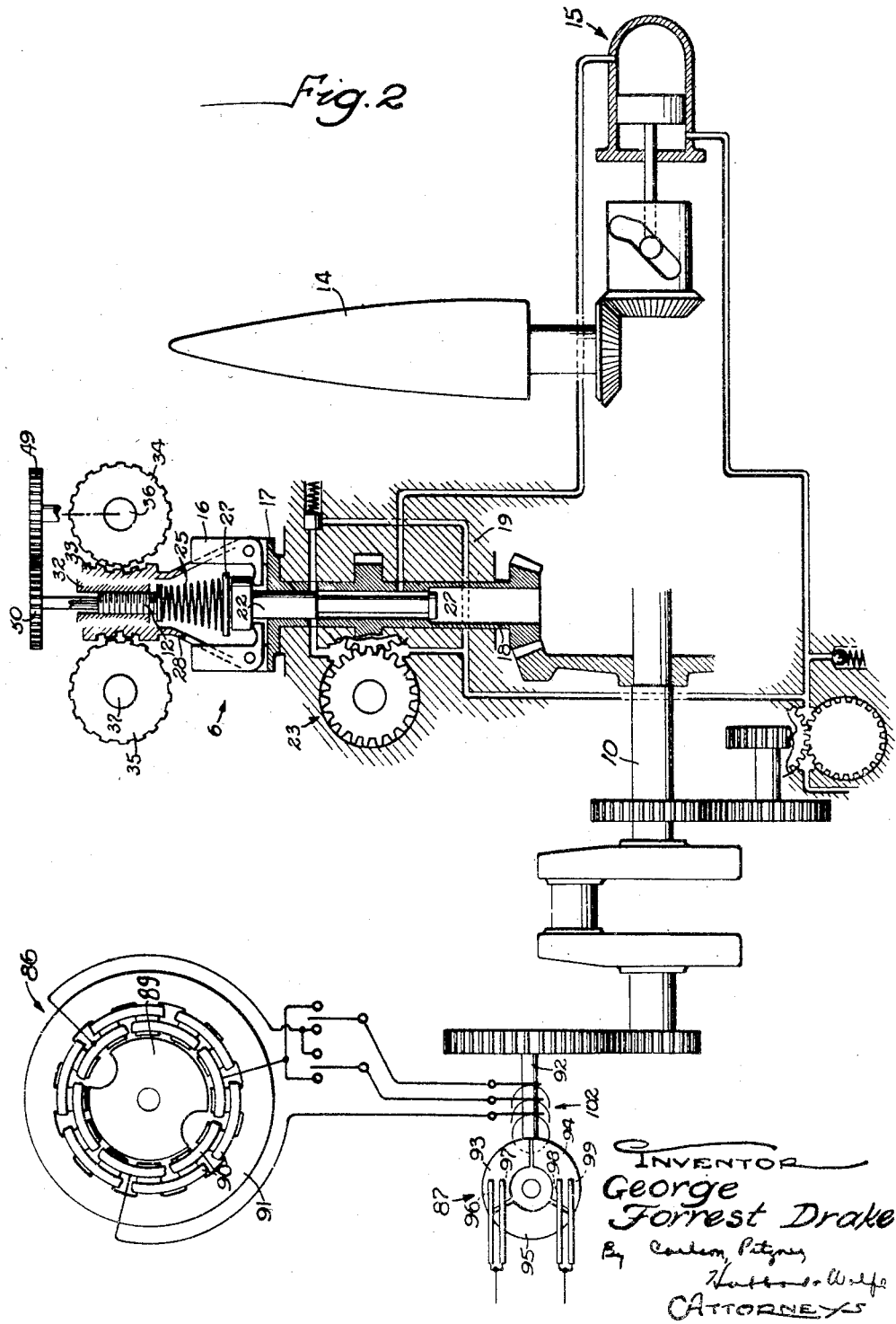
Fig. 2 is a schematic view of the governor and the associated mechanism.

As shown in Fig. 2, the motor comprises a permanently magnetized rotor 89 adapted to occupy any one of twelve well defined angular positions according to the combination of positive, negative, and zero direct current potential applied to three sets of distributed windings 90 on its stator 91. When the windings are deenergized, the rotor will come to an abrupt stop by virtue of a cogging action produced by the permanent magnet rotor.

Operation of the step motor in one direction or the other is effected by turning the shaft 92 of the transmitting switch 87 which has angularly spaced segments 93, 94, and 95 engaged as shown in Fig. 2 by contacts 96, 97, 98, and 99. These are arranged in pairs respectively connected to the different polar terminals of the battery 49 so as to produce the successive combinations of potentials for causing the rotor 89 to follow the motion of the transmitting switch actuator.

One of the battery connections leading to the commutating switch includes switches 100, and the conductors 88 include switches 101 both having movable contacts connected to the solenoid actuated rod 58 and arranged so that all of these switches are open when neither of the solenoids 59 and 60 is energized, the motor 86 then being non-responsive to operation of the commutating switch 87. When either solenoid is energized, the switches 100 and 101 are closed, and the transmitter 87 is connected to the receiver 86. The connections 88 include slip rips 102 (Fig. 2) and the shaft 92 of the switch may, as in this instance, be driven through suitable gearing from the engine shaft 10.

Additional switches 43' and 44' are provided for controlling the drives for the speed adjusters 12 individually and independently of the follow-up mechanism above described. There are two pairs of these switches, one for each governor, arranged in parallel with the corresponding switches 43 and 44. The movable contact of each pair may be actuated by suitable manually operable means located at the remote control point adjacent the control lever 61.

*Operation*

Figure 1:
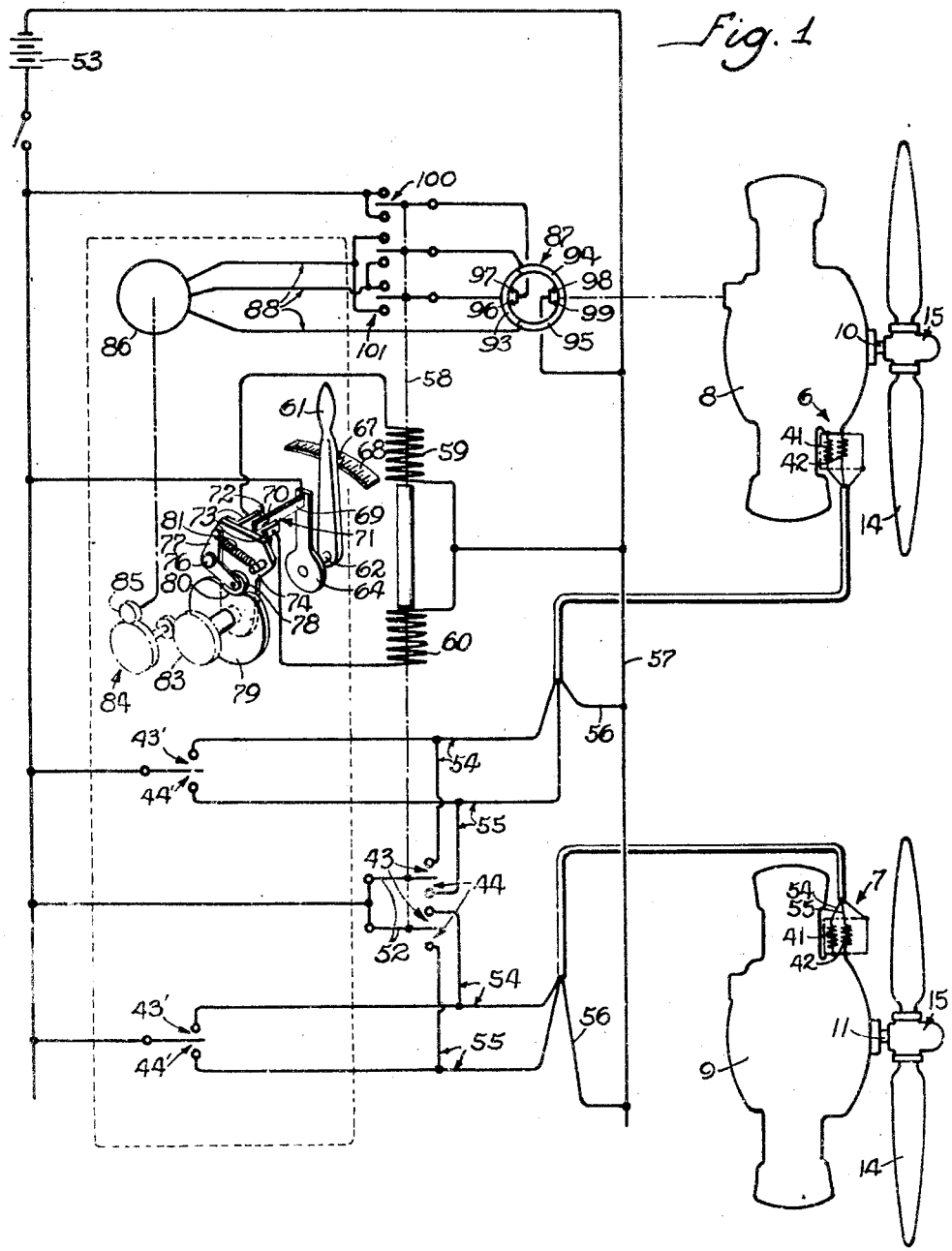

The operation of the control above described is as follows, assuming that the parts are positioned as shown in Fig. 1 with the engines 8 and 9 operating. The step motor 86 will be idle because the switches 100 and 101 are open, and both windings of the magnetic couplings will be deenergized because of the open condition of the control switches 70 and 71. Now, assume that the hand lever 61 is advanced to bring the pointer 67 opposite a graduation on the scale 68 indicating a new desired engine speed. In the initial part of this movement, the switch 70 will be closed, and the arm 74 will be picked up and moved with the hand lever to the selected position which is maintained frictionally. Closure of the switch 70 energizes the solenoid 59 which closes the switches 43, 100, and 101. The latter switches render the transmitter 87 effective to drive the motor 86, while closure of the switches 43 energizes the coupling windings 41. Thus, as the speed adjusting screws 12 are turned by power derived from their associated engines, the motor 86 will rotate in unison with the engine 8 and turn the cam 79 counterclockwise to follow up the previous motion of the hand lever 61. Such operation continues until the notch 80 of the cam 79 has been brought opposite the roller 78 whereupon the switch 70 will be opened deenergizing the solenoid 59 which again disables the commutating switch 87 and interrupts the magnetic drives to the speed adjusters 12.

In a similar way, the other windings 42 of the magnetic couplings are energized to effect the reverse speed adjustments of the governors when the hand lever 61 is shifted in the opposite direction. The switch 71 is thus closed and the solenoid 60 is energized, operation of the follow-up motor 86 then continuing until the cam 79 has returned to the position corresponding to the newly selected position of the hand lever.

In either of the cases described, the follow-up motion will be in unison with the engine 8 and, therefore, is proportional to the extent of rotation of the adjusting screws 12. As a result, the motion imparted to the latter will correspond to the change in the position of the hand lever 61. By utilizing power derived from engines to actuate the speed adjusters 12, the provision of an electric motor or other separate power source on the engines and the complications incident to the use of such a source are avoided.

Whenever it is desirable to adjust the speed settings of the governors individually, the switch 43' or 44' of the selected governor is operated manually. By this operation and for other reasons, the adjusters 12 of one engine may lead the other. To bring the two back into step, it is only necessary, either by moving the lever 61 or the contact of both pairs of switches 43' and 44' until the adjusters of both governors have reached the selected limit positions determined by engagement of the pins 110 with one of their stops. Starting from these corresponding limit positions, both adjusters 12 will remain substantially in step in response to subsequent movements of the control lever.

I claim as my invention:

1. A remote control system having, in combination, a rotary member adapted to be power driven, an associated part to be moved in opposite directions to different positions selectable at a remote point of control, couplings adapted to be rendered operative selectively to couple said rotary member to said part to drive the latter in opposite directions, magnetic windings energizable to render the respective couplings operative in driving said part in a selected direction, a commutating switch driven in unison with said member, an electric motor located at said remote control point and adapted when electrically connected to said switch to rotate in unison therewith, means including control switches at said remote point controlling the energization of said coupling windings selectively, an element at said remote point manually movable to various positions and operable during such movement to close one or the other of said control switches, means driven by said motor and actuating said control switches to follow-up the movement of said element and open the closed switch when the selected position of said part has been reached, and means for electrically connecting said commutating switch and said motor while either one of said control switches is closed and disconnecting the same when both of said control switches are open.

2. A remote control system having, in combination, a rotary member adapted to be power driven, an associated part to be moved in opposite directions to different positions selectable at a remote point of control, couplings adapted to be rendered operative selectively to couple said rotary member to said part to drive the latter in opposite directions, magnetic windings energizable to render the respective couplings operative in driving said part in a selected direction, an electrical transmitter driven in unison with said rotary member, an electric motor at said remote point of control adapted when connected to said transmitter to rotate in unison therewith, an element at said remote point manually movable to various positions corresponding to desired settings of said part, energizing circuits for said windings including switching means rendered operatively movement of said element to a new position to energize a corresponding one of said coupling windings, means driven by said motor and actuating said switching, means to follow-up the movement of said element and deenergize the active coupling winding when the position of said part corresponding to the selected position of the control element has been reached, and means for electrically connecting said transmitter and said motor while either one of said couplings is energized and to disable the transmitter when both couplings are deenergized.

3. A remote control system having, in combination, a rotary member adapted to be power driven, an associated part to be moved in opposite directions to different positions selectable at a remote point of control, couplings adapted to be rendered operative selectively to couple said rotary member to said part to drive the latter in opposite directions, a transmitter driven in unison with said member, an electric motor located at said remote control point and adapted when electrically connected to said transmitter to rotate in unison therewith, means including control switches at said remote point controlling the energization of said couplings selectively, an element at said remote point manually movable to various positions and operable during such movement to close one or the other of said control switches, and energize the one of said couplings which causes movement of said part in a corresponding direction, and means driven by said motor and actuating said switches to follow-up the movement of said element and open the closed switch when the selected position of said part has been reached.

4. In a control system, the combination of a power driven member, a part associated with said member and movable in opposite directions, electrically controlled drive couplings between said member and said part respectively operable to drive the part in opposite directions, a transmitter continuously driven in unison with said member, a remotely located manually movable control element, electric circuits for said couplings, means operable in response to each successive positional adjustment of said control element for energizing one or the other of said coupling circuits and thereby render the corresponding coupling operative to drive said part in a direction corresponding to the direction of shift of the control element, and means energized under the control of said transmitter for subsequently disabling said coupling upon the completion of a movement of said element proportional to the shift of said control element which instituted such movement.

5. In a remote control system, the combination of, a part whose position is to be variably adjusted, a member rotated continuously, a manually displaceable control element located at a point of control remote from said member, mechanism including switching means actuated by said element for establishing a driving connection between said part and said member in response to a shift of the control element to a new position, means for interrupting the movement of said part after rotation of said member through an angular distance proportional to the shift of said control element including a follow-up element for actuating said switching means, an electrical transmitter driven by said member, an electrical receiver rotatable in unison with said transmitter and having an operating connection with said follow-up element, and means for disconnecting said transmitter and receiver simultaneously with the interruption of said driving connection.

6. In a remote control system, the combination of, a part whose position is to be variably adjusted, a member adapted to be rotated continuously, a manually displaceable control element located at a point of control remote from said member, means for establishing a driving connection between said part and said member in response to a shift of said control element to a new position, and follow-up means operable to terminate such movement of the part in response to rotation of said member through an angular distance proportional to the shift of said control element, said last mentioned means including a commutating switch driven by said member and a step motor at said remote point energized by said switch.

7. In a remote control system, the combination of, a part whose position is to be variably adjusted, a member adapted to be rotated continuously, a manually displaceable control element located at a point of control remote from said member, means for establishing a driving connection between said part and said member in response to a shift of said control element to a new position, and means operable to terminate such movement of the part in response to rotation of said member through an angular distance proportional to the shift of said control element including a follow-up element coacting with said control element, an electrical transmitter driven by said member, and a receiver connected to and rotatable in unison with said transmitter and driving said follow-up element.

8. In a control system for utilizing a power driven member to adjust the position of a reversely shiftable part, the combination of coupling means adapted to be rendered operative selectively to provide a driving connection between said part and said member, actuating windings selectively energizable to render said coupling means operative to drive said part in opposite directions, an electrical transmitter adapted to be driven continuously from said member, an electric receiver at a remote point adapted to move in unison with said transmitter when electrically connected thereto, an element at said remote point manually movable to various positions corresponding to desired positions of said part, energizing circuits for said windings and said receiver including switching means actuated by each movement of said control element to a new position and operable to energize said windings selectively for driving of said part in a corresponding direction by said coupling means and for simultaneously connecting said transmitter to said receiver for movement of the latter in a direction corresponding to the movement of the control element, and means operable in response to movement of said receiver through a distance proportional to that of the control element for automatically restoring said switch means to its initial condition to terminate the energization of said windings.

9. In a remote control system, the combination of, a plurality of parts whose positions are to be variably adjusted, power driven members associated with the respective parts and adapted to be rotated continuously, a manually displaceable control element located at a point of control remote from said parts, means for establishing driving connections between said parts and the respective members in response to a shift of said control element to a new position, a follow-up element coacting with said control element to interrupt said connections, an electrical transmitter driven by one of said members, an electrical receiver rotatable in unison with said transmitter, means actuated by said receiver for driving said follow-up element toward the shifted position of said control element, and means for disabling said transmitter during the time that said driving connections are interrupted.

10. A remote control system having, in combination, a rotary member adapted to be rotated continuously, an associated part to be moved in opposite directions to different positions selectable at a remote point of control, electrically controlled coupling means operable to establish a driving connection between said member and said part to drive the latter selectively in one direction or the other, an electrical transmitter driven in unison with said member, an electric motor located at said remote control point and adapted when electrically connected to said transmitter to rotate in unison therewith, means including switching means at said remote point controlling the energization of said coupling means, an element at said remote point manually movable to various positions and operable during movement to a new position to actuate said switching means and establish said driving connection, means driven by said motor and actuating said switching means to follow-up the movement of said element and deenergize said coupling means when the selected position of said control element has been reached, and means for rendering said transmitter operative to energize said motor while said driving connection is established and to interrupt the operation of the motor when said connection is broken.

11. In a remote control system, the combination of, a plurality of parts whose positions are to be variably adjusted individually or in unison, power driven members associated with the respective parts and adapted to be rotated continuously, magnetic couplings having mechanically disengaged elements adapted when energized to transmit rotary power to the associated part until the latter is stalled, means for limiting the motions of said parts to corresponding positions to thereby bring the parts into step, a remotely located variably movable control element, and means controlled by said element and energizing said couplings selectively to cause movement of said parts into positional agreement with said control element.

12. In a remote control system, the combination of, a part whose position is to be adjusted from a remote point of control, a member at said remote point manually movable back and forth to select desired positions into which said part is to be moved, reversible electrically controlled driving means adapted to be energized selectively and operable to cause movement of said part in one direction or the other, energizing circuits for the respective driving means, switching means actuated by said member to close said energizing circuits selectively and initiate operation of said driving means, a rotary electrical synchronous transmitter adapted to be driven continuously, an electrical synchronous receiver energized by said transmitter and following the motion thereof, an element having a driving connection with said receiver and driven thereby in a direction to follow up the motion of said manually operable member, and means actuated by said element and operating said switching means to interrupt the operation of said driving means when said element has reached said member.

GEORGE FORREST DRAKE.

REFERENCES CITED

The following references are of record in the file of this patent:

UNITED STATES PATENTS

| Number | Name | Date |
| --- | --- | --- |
| 1,883,163 | Van Voorhis, Jr. | Oct. 18, 1932 |
| 2,191,955 | Chappell et al. | Feb. 27, 1940 |
| 2,311,010 | Vickers | Feb. 16, 1943 |
| 2,327,341 | Drake | Aug. 24, 1943 |
| 2,347,590 | Binder | Apr. 25, 1944 |